March 2, 1937. H. A. W. KLINKHAMER 2,072,210
THREE-PHASE TRANSFORMER AND PROTECTIVE DEVICE THEREFOR
Filed Feb. 7, 1935  2 Sheets-Sheet 1

Inventor:
H.A.W.Klinkhamer,
by
Att'y.

March 2, 1937. H. A. W. KLINKHAMER 2,072,210
THREE-PHASE TRANSFORMER AND PROTECTIVE DEVICE THEREFOR
Filed Feb. 7, 1935 2 Sheets-Sheet 2
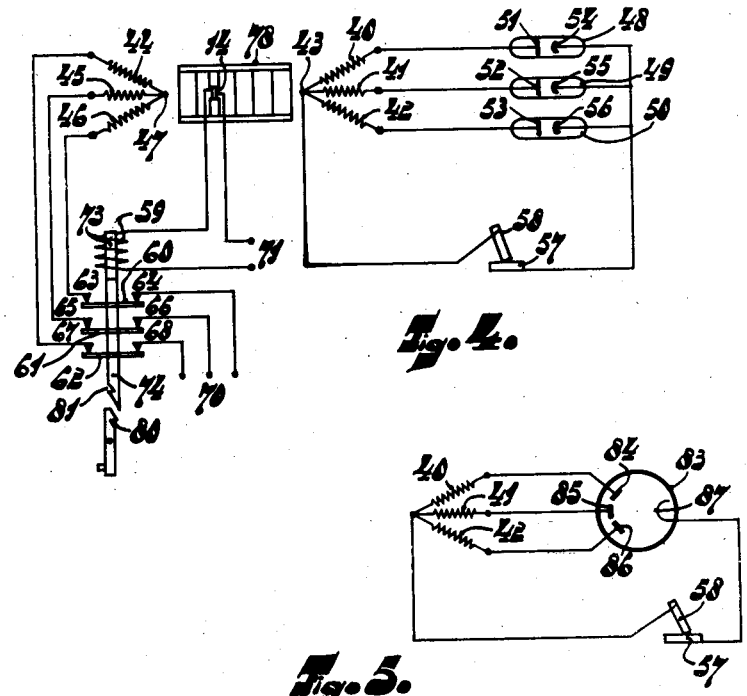
Fig. 4.
Fig. 5.
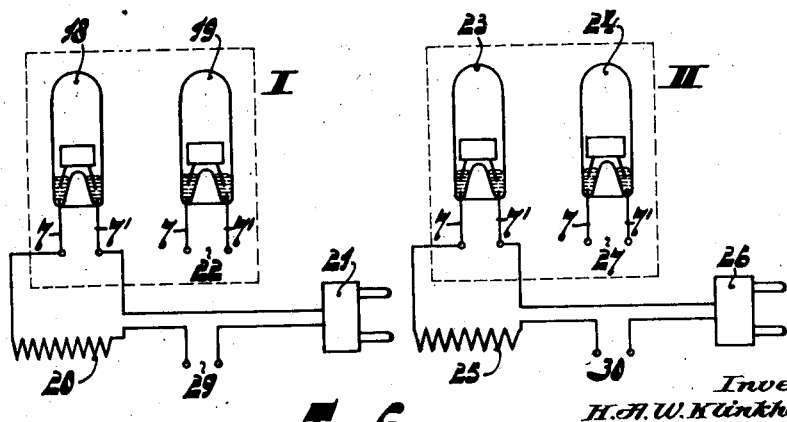
Fig. 6.
Inventor:
H. A. W. Klinkhamer,
by his Attorney.

Patented Mar. 2, 1937

2,072,210

UNITED STATES PATENT OFFICE 2,072,210

THREE-PHASE TRANSFORMER AND PROTECTIVE DEVICE THEREFOR

Hendrik Abraham Wijnand Klinkhamer, Eindhoven, Netherlands, assignor to N. V. Philips' Gloeilampenfabrieken, Eindhoven, Netherlands Application February 7, 1935, Serial No. 5,440
In Germany February 12, 1934

4 Claims. (Cl. 175—294)

This invention relates to three-phase transformers and more particularly to protective devices for use with such transformers.

When using a three-phase transformer with a load which is subjected to large current variations, there is the danger of the load becoming unbalanced, whereby individual phases may be overloaded.

Furthermore, in certain applications, for instance, when gas-filled rectifier tubes are connected in the individual phases, for example, when, for direct-current welding, a star-connected transformer is used with three rectifier tubes connected in series with the three-phase windings of the transformer, unbalancing of the load will be caused by back ignition in one of the tubes, or the breakdown of a tube. In the case of back ignition of a tube, unless the circuit is interrupted, a permanent injury to the tube will result, whereas if one of the tubes becomes inoperative, a very great overloading of the remaining tubes, with resulting injury to same, takes place.

According to the invention a protective device is applied to the transformer to interrupt the circuits whenever the load becomes unbalanced for whatever reason; this protective device operating to insure immediate and automatic protection.

More specifically I provide between the upper and lower yokes of the transformer and outside of the windings, a magnetically-operated contact device, which is actuated directly by the magnetic leakage field set up when an unbalancing of the load takes place, i. e., when the sum of the secondary currents differs from zero.

In a preferred form of my invention I provide a magnetizable body disposed in the leakage field of the transformer and which, when magnetized, directly actuates contacts to interrupt the magnetization of the transformer.

I am aware that it has already been proposed to use protection devices controlled by the leakage field of a three-phase transformer to cause the unbalancing of the load to deenergize the transformer. However, in prior art devices a special winding was provided in which, under the action of the leakage field, currents were induced and these currents in their turn actuated a relay to interrupt the transformer circuit.

A protective device according to my invention has not only the advantage of greater simplicity and lower cost, but also of greater reliability, especially if the unbalancing of the load is considerable and the created change in the leakage field is large; this being, for instance, the case when, in the above-mentioned application, an unbalancing takes place due to the back discharge or inoperativeness of one of the tubes.

In order that the invention may be more clearly understood and readily carried into effect, it will be more fully explained in reference to the accompanying drawings, in which:

Fig. 4 is a schematic diagram showing the device and circuits in accordance with the invention.

Fig. 5 is a schematic diagram showing the load-side of Fig. 4 when using a single three-phase rectifier instead of three individual single-phase rectifiers.

Fig. 6 is a schematic diagram showing the connections of the contact devices, when two transformers are used in parallel.

Figure 1:
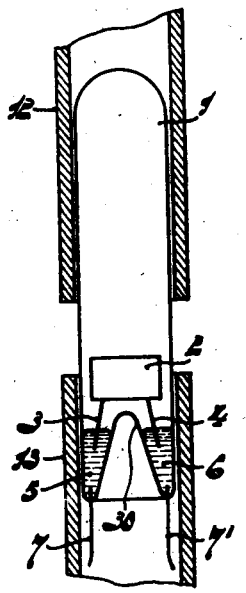
Figure 1 is a sectional side view of one form of contact device, suitable for the protective device of the invention.

Fig. 1 illustrates a contact device comprising a cylindrical envelope 1, for instance, of glass, the lower end of which forms two chambers separated by means of an inwardly-projecting partition 10. Within the chambers are formed mercury pools 5 and 6 respectively, which are connected to the outside by lead wires 7 and 7' respectively, hermetically sealed through the envelope 1.

The device is preferably exhausted or filled with an inert gas.

Arranged within the envelope 1 and supported by the upward bent portion of the bottom and guided therein by the wall of the envelope is a ferromagnetic member 2, which is shiftable in the direction of the axis of the device under the influence of a magnetic field. The ferromagnetic member 2 is provided with two contact strips 3 and 4, which in the lower or normal position of the member 2, bridge through said member, the mercury pools 5 and 6, and thereby close a circuit passing through leads 7 and 7'.

When member 2 is raised by magnetic force, the contact strips 3 and 4 are removed from the mercury pools and the circuit is interrupted. To concentrate the magnetic field around the envelope 1 so as to act on the member 2, ferromagnetic sleeve members, for instance in the form of iron tubes 12 and 13, surround the upper and lower portions respectively of the envelope 1; the tubes 12 and 13 being disposed in the magnetic leakage path of the transformer, as will be shown hereinafter.

Figure 2:
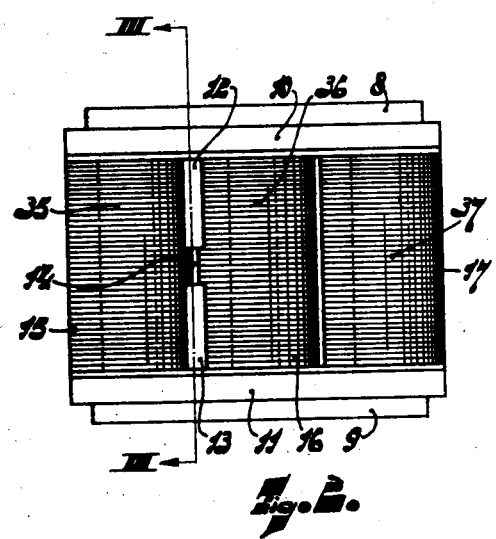
Fig. 2 is an elevation of a three-phase transformer showing the protective device applied thereto.
Figures 3, 7:
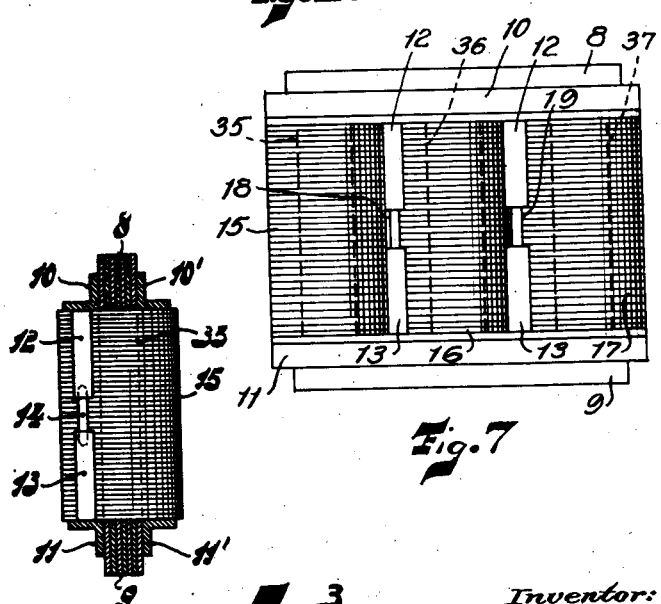
Fig. 3 is a section of Fig. 2 along the line III—III.
Fig. 7 is an elevation of a three-phase transformer provided with two protective devices.

Referring to Figs. 2 and 3, the three-phase transformer shown therein comprises a core consisting of three legs 35, 36 and 37, an upper yoke 8 and a lower yoke 9, the laminations of the yokes being held together, for instance, by means of angle pieces 10—10', and 11—11' (see Fig. 3). The legs of the transformer core are surrounded by coils 15, 16, and 17 respectively, each coil comprising a primary winding and a secondary winding.

Between coils 15 and 16 and secured to the pieces 10 and 11 is arranged a contact device 14 which may be of the type shown in Figure 1; the leakage field being concentrated in a magnetic path of low reluctance by means of the ferromagnetic members 12 and 13, these being preferably soft iron tubings secured to the angle pieces 10 and 11 respectively and partly surrounding the device 14.

As under normal operating conditions the leakage field is negligible and practically no lines of magnetic force pass through the members 12 and 13, these members need not be laminated.

The contact device 14 is so disposed that its magnetic member, for instance, the magnetic member 2 of the contact device of Figure 1, is so located in respect to the adjacent ends of members 12 and 13 that a maximum sensitivity of the device be obtained.

Under normal operating conditions, i. e., when the load is properly balanced and the sum of the secondary currents are equal to zero, the leakage field passing through the members 12 and 13 is almost negligible and at least too weak to operate the magnetic member of the contact device. The circuit controlled by the contact device remains thus closed. However, when the load becomes sufficiently unbalanced to set up a strong leakage field, such field directly actuates the magnetic member of the contact device, which in turn causes the circuit controlled thereby to deenergize the transformer.

The use of the contact device in a direct current welding installation using three individual rectifier tubes is shown in the diagram of Fig. 4, in which the core 78 of a three-phase transformer is provided with three star-connected primary windings 44, 45, and 46, and three star-connected secondary windings 40, 41, and 42. The invention is however also applicable to other multiphase and otherwise connected transformers. Arranged on the transformer in the manner above indicated is a contact device 14. For rectifying the secondary three-phase-current there are provided three single-phase rectifier tubes 48, 49, and 50, having anodes 51, 52, and 53, and cathodes 54, 55, and 56 respectively. One end of each of the secondary windings 40, 41, and 42 are connected to the star point 43, which is also connected to the welding electrode 58; the free ends of secondary windings being connected to the individual anodes of the rectifier tubes; the interconnected cathodes of which are connected to the work piece 57.

The means to deenergize the transformer upon the action of the protective device is illustrated as an example, by a three-pole magnetically-operated switch 73 having an actuating coil 59, a plunger rod 74, and cooperating contact pairs 63—64, 65—66, 67—68. Mounted on the plunger rod and insulating therefrom and from each other, are three contact bars 60, 61, and 62, which, when the switch is energized, bridge the contact pairs 63—64, 65—66, and 67—68 respectively. The lower end of the plunger rod is provided with a device, shown as a notch 81, which engages a latch 80 when the plunger rod drops into its lower position, and which retains it until manually released. The switch 73 is shown as being the main control switch, however, an additional main switch may be provided to connect contacts 64, 66 and 68 to the three-phase supply 70. The contacts 63, 65, and 67 are connected to the free ends of the primary windings 46, 45 and 44, respectively, whose other ends are interconnected at the star point 47 and when the switch 73 is closed, the transformer is energized.

The switch coil 59 is connected in series with the contact device 14 and a source of current supply 71, which may be obtained from the three-phase supply 70.

As long as the load is balanced the leakage field is insufficient to cause the contact device to open its contacts, coil 59 is energized from source 71, and the transformer is energized.

Upon the unbalancing of the load, due for instance, to a back discharge in one of the rectifier tubes, the leakage flux increases sufficiently to cause contact device 14 to break the switch coil circuit, which results in the plunger 74 dropping and deenergizing the primary windings of the transformer; the plunger 74 being retained by notch 81 until, after remedying the cause of the unbalancing, the plunger 74 is released.

Fig. 5 shows the right-hand or load portion of Fig. 4 for the case when a single three-phase rectifier tube 83, having anodes 84, 85 and 86, and a common cathode 87, is used.

In case it is desired to operate from a common three-phase source, a plurality of such welding outfits in parallel—each having its own transformer—each of the transformers is provided with two contact devices. The circuit arrangement for the protective devices is schematically shown in Fig. 6, in which two contact devices 18 and 19 are provided on transformer I and two contact devices 23 and 24 are provided on transformer II. Transformers I and II are of similar construction; transformer I being shown in Fig. 7 and being similar to the transformer of Fig. 2 except that two contact devices are provided. The lead 7' of contact device 18 is connected to one pole of a two-pole plug 21 and the lead 7 is connected through the coil 20 of a switching device, serving to disconnect transformer I, to one side of a current source 29, whose other side is connected to the other pole of plug 21.

Similarly, the lead 7' of contact device 23 is connected to one pole of a two-pole plug 26 and the lead 7 is connected through a coil 25 of a switching device, serving to disconnect transformer II, to one side of a current source 30, whose other side is connected to the other pole of the plug 26. The leads 7 and 7' of contact devices 19 and 24 are respectively connected to the two poles of sockets 22 and 27, which sockets are adapted to receive the contact plugs 21 and 26.

When only the transformer I is used the plug 21 is connected to socket 22, whereby, upon the operation of either contact devices 18 or 19, the coil 20 is deenergized and the transformer disconnected.

On the other hand, if both transformers I and II are to be used, the plug 21 is connected to socket 27, and plug 26 is connected to socket 22. In this case coil 20, and thus transformer I, is deenergized when either contact device 18 or 24 breaks its contact, and thus transformer II is deenergized when either contact device 19 or 23 breaks its contact. Thus, if a defect occurs both coils 20 and 25 are deenergized and both transformers are cut out of circuit.

The operation of the device according to the invention does not depend upon the shape of the current curve through the transformer secondary, which is important as in many cases, particularly when load impulses suddenly occur, the shape of this curve may differ essentially from a sinusoidal shape.

While I have described my invention on hand of specific examples and specific application, I do not wish to be limited thereto, but desire the appended claims to be construed as broadly as permissible in view of the prior art.

What I claim is:

1. In combination, a three-phase transformer comprising a core having three legs and two yokes, a secondary winding on each of said legs, a partial magnetic circuit formed between said yokes, said magnetic circuit having an interruption, and a protective device comprising a movable magnetic member actuated by the leakage field set up when the sum of the currents in the secondary windings differs from zero, to substantially bridge said interruption of the magnetic circuit.

2. In combination, a polyphase transformer comprising a core having three equal legs and two yokes, three equal primary windings disposed one on each leg, and three equal secondary windings disposed one on each leg; and a protective device disposed between said yokes and outside of said windings, said device comprising a magnetically-operated contact device actuated by the leakage field resulting from an unbalancing of the load on said transformer.

3. In combination, a polyphase transformer comprising a core having three equal legs and two yokes, three equal primary windings disposed one on each leg, and three equal secondary windings disposed one on each leg; and a protective device disposed between said yokes and outside of said windings, said protective device comprising two ferromagnetic members separated by an air-gap, and a magnetically-operated contact device disposed in the vicinity of said air-gap, said protective device being actuated by the leakage field set up when an unbalancing of the load occurs.

4. In combination, a polyphase transformer comprising a core having three equal legs and two yokes, three equal primary windings disposed one on each leg, and three equal secondary windings disposed one on each leg; a protective device disposed between said yokes and outside of said windings, said protective device comprising two ferromagnetic sleeves separated by an air-gap, and a magnetically-operated mercury switch disposed within one of these sleeves and in the vicinity of the air-gap, said protective device being actuated by the leakage field resulting from the unbalancing of the load on said transformer.

HENDRIK ABRAHAM WIJNAND KLINKHAMER.